(12) United States Patent
Hillier

(10) Patent No.: US 6,493,428 B1
(45) Date of Patent: Dec. 10, 2002

(54) TEXT-ENHANCED VOICE MENU SYSTEM

(75) Inventor: Curt Hillier, Round Rock, TX (US)

(73) Assignee: Siemens Information & Communication Networks, Inc, Boca Raton, FL (US)

( * ) Notice: Subject to any disclaimer, the term of this patent is extended or adjusted under 35 U.S.C. 154(b) by 0 days.

(21) Appl. No.: 09/136,210

(22) Filed: Aug. 18, 1998

(51) Int. Cl.[7] .......................... H04M 1/64; H04M 1/56; H04M 3/42; H04M 3/00
(52) U.S. Cl. ...................... 379/67.1; 379/76; 379/88.13; 379/88.16; 379/142.14; 379/201.01; 379/265.09; 379/908
(58) Field of Search ....................... 379/67.1, 71, 88.01, 379/52, 88.11–88.21, 93.05, 93.08, 93.09, 93.11–93.17, 93.35, 100.01, 100.09, 100.13–100.15, 88.04, 88.07, 88.08, 142.01, 214.01, 265.09, 908; 704/258, 260, 270, 271, 275; 707/10, 104

(56) References Cited

U.S. PATENT DOCUMENTS

| | | | |
|---|---|---|---|
| 4,694,406 A | 9/1987 | Shibui et al. | 345/123 |
| 4,897,865 A | 1/1990 | Canuel | 379/93.26 |
| 4,922,516 A | 5/1990 | Butler et al. | 379/21 |
| 5,060,257 A | 10/1991 | Penalver | 379/100.11 |
| 5,450,123 A | 9/1995 | Smith | 348/14.12 |
| 5,457,731 A | 10/1995 | Witherspoon | 379/52 |
| 5,479,498 A | 12/1995 | Brandman et al. | 379/283 |
| 5,485,370 A | 1/1996 | Moss et al. | 364/408 |
| 5,524,141 A | 6/1996 | Braun et al. | 379/93.25 |
| 5,528,672 A | 6/1996 | Wert | 379/93.22 |
| 5,583,922 A | 12/1996 | Davis et al. | 379/93.09 |
| 5,712,901 A | * 1/1998 | Meermans | 379/88 |
| 5,802,526 A | * 9/1998 | Fawcett et al. | 707/104 |
| 5,810,600 A | * 9/1998 | Okada | 434/185 |
| 5,884,262 A | * 3/1999 | Wise et al. | 704/270 |
| 5,912,952 A | * 6/1999 | Brendzel | 379/93.25 |
| 5,943,648 A | * 8/1999 | Tel | 704/260 |
| 5,953,392 A | * 9/1999 | Rhie et al. | 379/88.13 |
| 5,987,454 A | * 11/1999 | Hobbs | 707/4 |
| 6,075,842 A | * 6/2000 | Engelke et al. | 379/52 |
| 6,119,137 A | * 9/2000 | Smith et al. | 707/523 |

FOREIGN PATENT DOCUMENTS

| | | |
|---|---|---|
| WO | 93 01665 | 1/1993 |
| WO | 97 23973 | 7/1997 |

OTHER PUBLICATIONS

IBM Technical Disclosure Bulletin, "Voice Augmented Menu Automated Telephone Response System"; vol. 38, No. 2, pp. 57–61.

* cited by examiner

Primary Examiner—Allan Hoosain

(57) ABSTRACT

A text enhanced voice menu system includes data storage, a voice communication path, a text communication path and switch logic. The data storage stores audio information for producing a voice menu, and stores text information for producing a text version of the voice menu. The voice communication path generates a voice menu from the audio information. The text communication path generates a text menu from the text information. The switch logic selects one of the voice menu and the text menu to be transmitted over a connection line.

10 Claims, 8 Drawing Sheets

Account Balance:
    $ xx,xxx.xx

Current interest rate:
    x.xx%

TEXT-ENHANCED VOICE MENU SYSTEM

BACKGROUND

1. Field of the Invention

The present invention concerns use of telecommunication and pertains particularly to a text-enhanced voice menu system.

2. Related Information

With the advent of telephone voice menus, many businesses, government agencies and individuals are able to off load redundant tasks onto a voice-automated menu system.

Public switched telephone networks can be used to transfer video as well as audio information. For example, U.S. Pat. No. 5,450,123 issued on Sep. 12, 1995 to David B. Smith for METHOD TO ENHANCE VOICE COMMUNICATIONS USING ENCODED ONE-WAY VIDEO SIGNALS UNDER BI-DIRECTIONAL USER OR NETWORK CONTROL FOR TRANSMITTING STORED OR REAL-TIME VIDEO OR IMAGE INFORMATION, discloses an arrangement for supplying audio and video signals from separate sources to a video telecommunication station. U.S. Pat. No. 5,583,922 issued on Dec. 10, 1996 to Richard A. Davis, et al., for TELECOMMUNICATION SYSTEM FOR AUTOMATIC SWITCHING BETWEEN VOICE AND VISUAL DATA COMMUNICATIONS USING FORMS, discloses a telecommunication system which provides voice and data communications over a conventional telephone line between a server station and a client station using visual forms. U.S. Pat. No. 5,528,672 issued on Jun. 18, 1996 to Gerald M. Wert for TELEPHONE SYSTEM WITH SUBSCRIBER SELECTED AUDIO AND IMAGE ANNOUNCEMENTS, discloses a telephone network system which routes audio and image announcements into a call originating from a local telephone station of a calling party. U.S. Pat. No. 5,524,141 issued on Jun. 4, 1996 to David A Braun et al. for SYSTEM AND METHOD FOR PROVIDING DIRECTORY INFORMATION OVER A TELEPHONY NETWORK USING ADSI, discloses a system and method for accessing directory information over a telephony network employing the ADSI protocol and for presenting the directory information at the user's conventional television monitor.

Additionally, in addition to audio and video images, data in various formats can be sent over a telephone network. For example, U.S. Pat. No. 4,922,516 issued on May 1, 1990 to Myron C. Butler et al. for TELEPHONE TECHNICIAN'S TERMINALS WITH AUTO-SELECTION OF DIAL PULSE ON DTMF SIGNALLING, discloses a field terminal for use in communicating in diverse modes with a central technician access network. U.S. Pat. No. 5,060,257 issued on Oct. 22, 1991 to George Penalver for VIDEOTEX TERMINAL FOR RECEIVING TELECOPIES, discloses a videotex terminal capable of receiving telecopies. U.S. Pat. No. 5,479,498 issued on Dec. 26, 1995 to Yigal Brandman et al. for DIGITAL LINE CARD HAVING UNIVERSAL PORT FOR UPGRADING ELECTRONIC MESSAGING SYSTEM, discloses a digital line card for use in an electronic messaging system which enables the receipt of voice and text or image data over a single communications port. U.S. Pat. No. 4,897,865 issued on Jan. 30, 1990 to Albert Canuel for TELEPHONE DATA COLLECTION DEVICE, discloses a telephone data terminal and data collection network for communicating data over a telephone system using DTMF tone dialing. U.S. Pat. No. 5,485,370 issued on Jan. 16, 1996 to Leslie C. Moss et al. for HOME SERVICES DELIVERY SYSTEM WITH INTELLIGENT TERMINAL EMULATOR, discloses communication between a user-friendly terminal, such as a "home terminal" shaped to resemble a conventional telephone, and a number of service provider computers such as financial institutions. U.S. Pat. No. 5,457,731 issued on Oct. 10, 1995 to Joe H. Witherspoon for EMERGENCY TELECOMMUNICATIONS DEVICE FOR THE DISABLED, discloses an emergency telecommunication system for the hearing or speech impaired which includes an interface electrically connecting the emergency system to a telephone communication system.

Despite the various usages of telephone networks to communicate other forms of data in addition to audio, there has been no text enhanced implementation of a voice-automated menu system for use with an enhanced telephone.

SUMMARY OF THE INVENTION

In accordance with the preferred embodiment of the present invention, a text enhanced voice menu system is presented. A server for the text enhanced voice menu system includes data storage, a voice communication path, a text communication path and switch logic. The data storage stores audio information for producing a voice menu, and stores text information for producing a text version of the voice menu. The voice communication path generates a voice menu from the audio information. The text communication path generates a text menu from the text information. The switch logic selects one of the voice menu and the text menu to be transmitted over a connection line.

The present invention allows for flexibility in handling phone calls by allowing voice menus to be presented alternatively in text menu format.

BRIEF DESCRIPTION OF THE DRAWINGS

FIG. 5, FIG. 6 and FIG. 7 show sample displays in accordance with a preferred embodiment of the present invention.

DESCRIPTION OF THE PREFERRED EMBODIMENT

Figure 1:
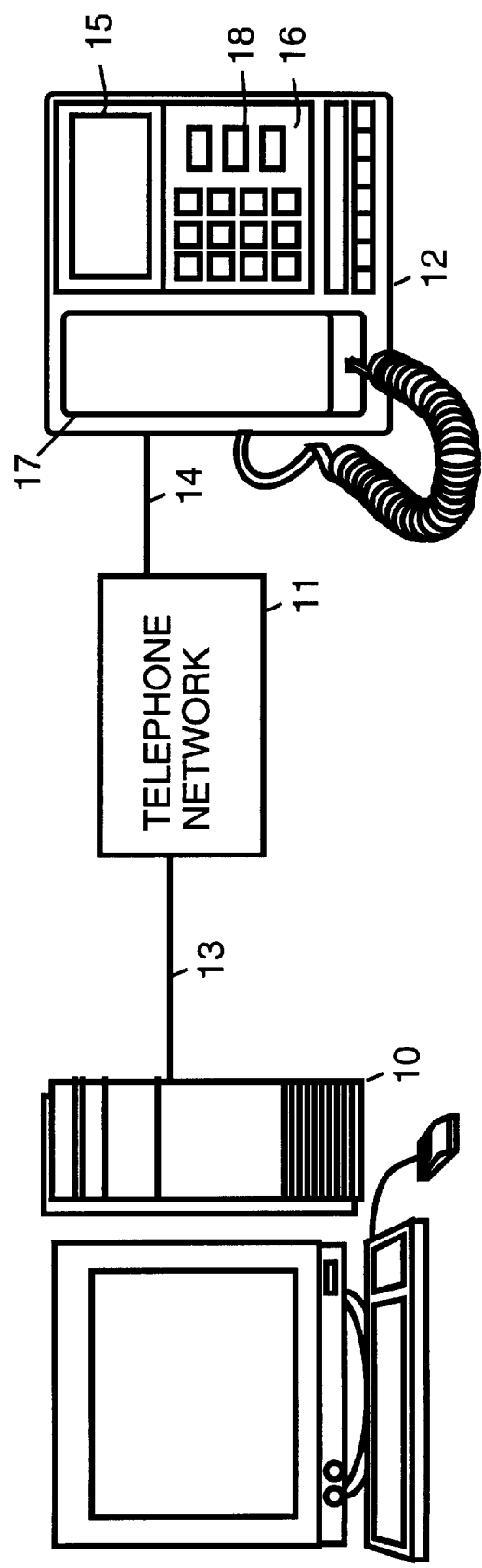
FIG. 1 is a simplified diagram of an enhanced telephone connected through a telephone network to a text-enhanced voice menu system in accordance with a preferred embodiment of the present invention.

FIG. 1 shows a simplified diagram of an enhanced telephone 12 connected through a telephone network 11 to a text-enhanced voice menu system server 10. Telephone network 11 is, for example, public switched telephone network, a private branch exchange (PBX), centrex, internet telephone connection or some other network which facilitates telecommunication. Text-enhanced voice menu system server 10 is connected to telephone network 11 through a connection line 13. Enhanced telephone 12 is connected to telephone network 11 through a connection line 14. For example, connection line 13 and connection line 14 are each an analog phone line. Enhanced telephone 12 includes a handset 17, a display 15, and a keypad 16. Display 15, is for example, a liquid crystal display (LCD) with a minimum of two lines, each line holding 20 to 30 characters per line. Alternatively, display 15 can be implemented using different display technology, which displays the same amount or a different amount of text.

A button 18 is used to enable and disable the text enhanced voice menu mode of enhanced telephone 12.

Text enhanced voice menu system server 10 provides a voice menu to a caller in a standard fashion. In addition, text enhanced voice menu system server 10 is capable of sending menu information in the form of text instead of (or in addition to) in a voice communication when an enhanced telephone is capable of displaying the menu information in the form of text.

Figure 2:
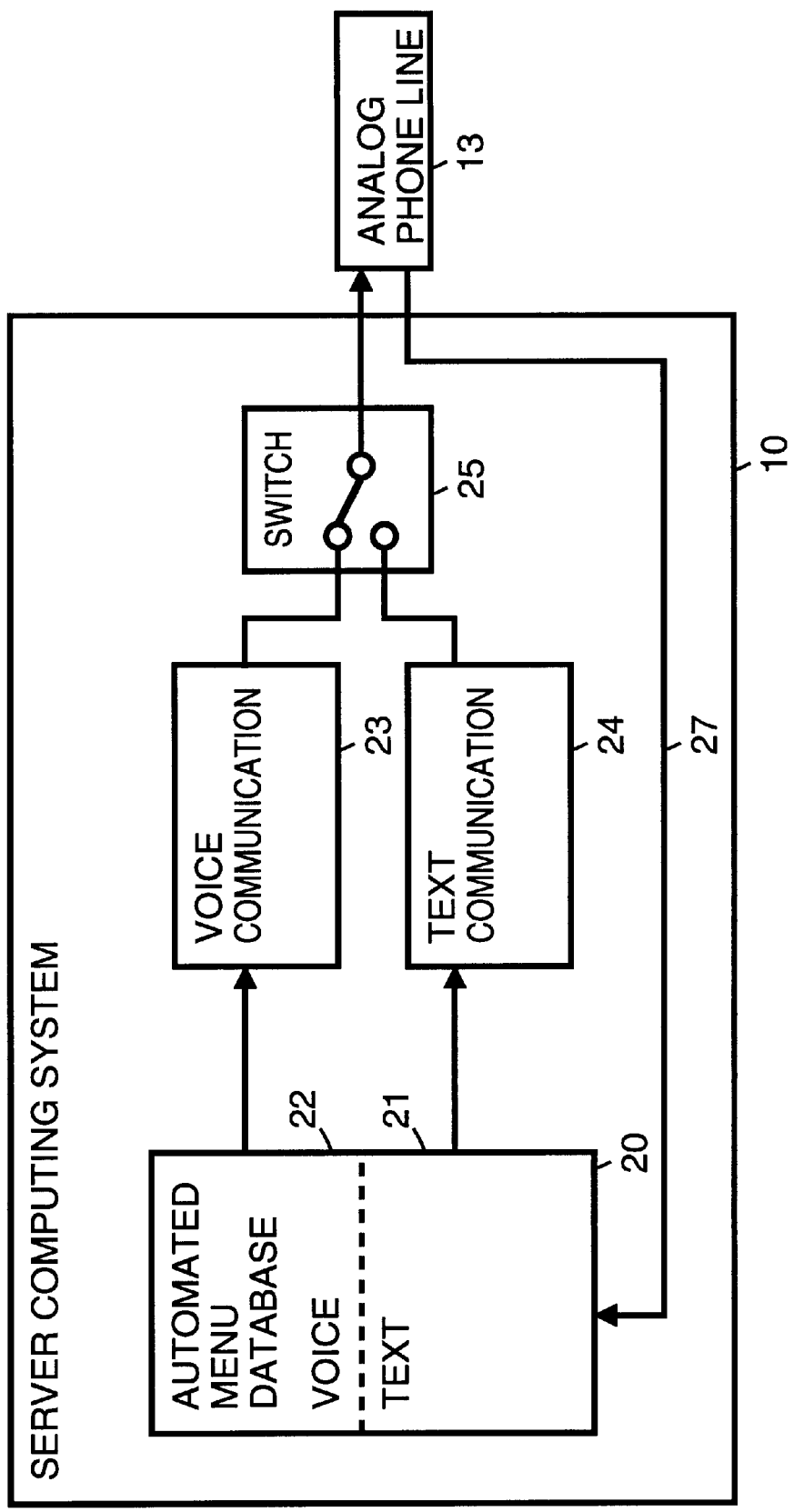
FIG. 2 is a simplified block diagram of the text-enhanced voice menu system shown in FIG. 1 in accordance with a preferred embodiment of the present invention.

FIG. 2 is a simplified block diagram of the unique features of text-enhanced voice menu system server 10. An automated menu database 20 includes a voice storage area 22 and a text storage area 21. Voice communication logic 23 produces voice menus from information stored in voice storage area. Text communication logic 24 produces text menus from information stored in text storage area. Switch logic 25 chooses which information to forward to connection line 13.

Figure 8:
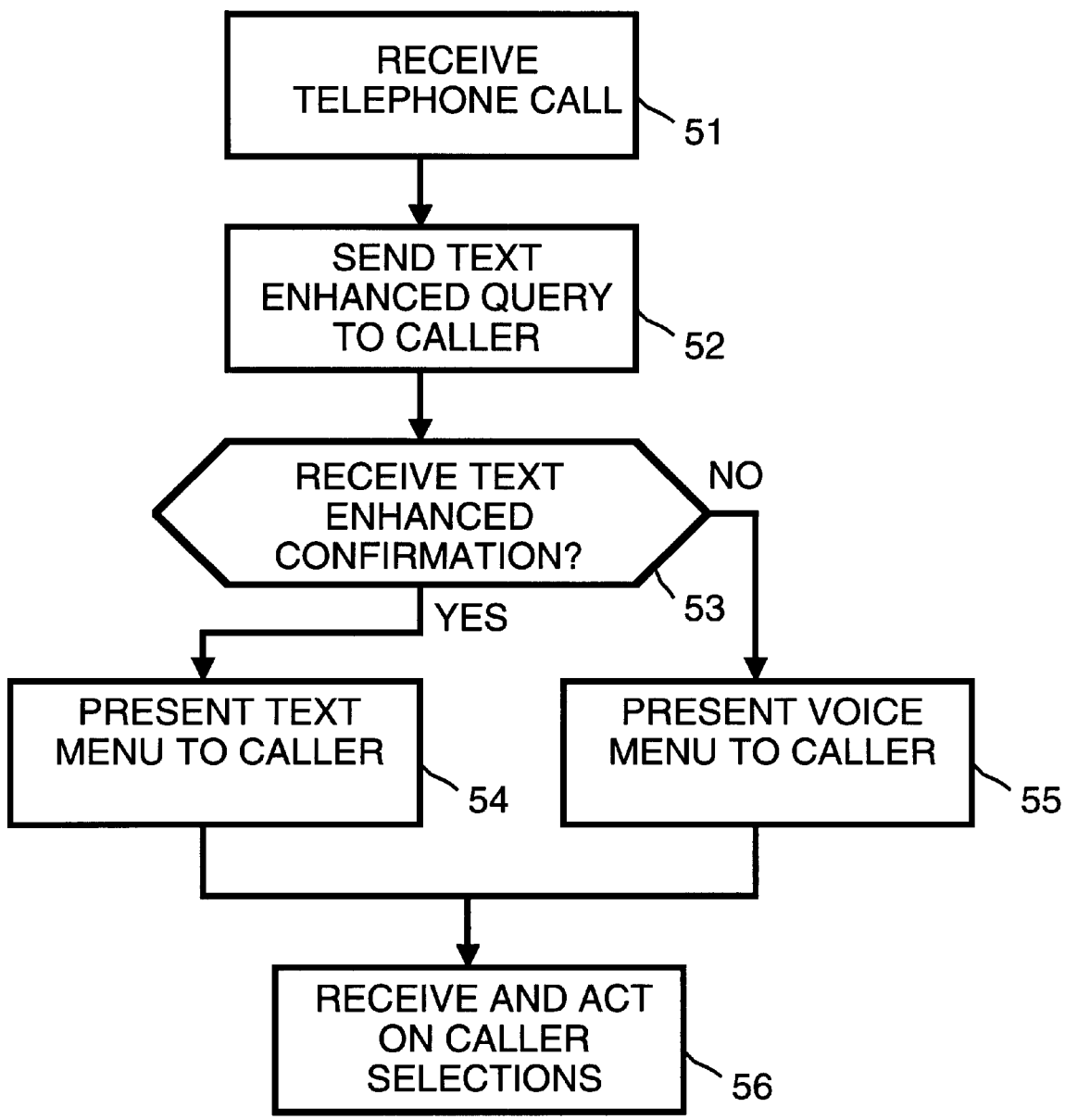
FIG. 8 is a flowchart which illustrates control logic for a switch for the text-enhanced voice menu system shown in FIG. 2 in accordance with a preferred embodiment of the present invention.

FIG. 8 illustrates the control logic for switch 25. In a step 51, a telephone call is received. In a step 52, a query is sent to the calling entity to determine whether the telecommunication device used by the caller supports text enhancement. If, in a step 53, a text enhanced confirmation is received, in a step 54, switch 25 allows a text menu to be presented to the caller. If, in step 53, no text enhanced confirmation is received, in a step 55, switch 25 provides for a voice menu to be presented to the caller. In a step 56, text-enhanced voice menu system server 10 receives and acts on the caller selections. This is illustrated by data path 27 shown in FIG. 2. The selections by the caller can be transferred to text-enhanced voice menu system server 10, for example, in the form of DTMF tones or voice commands.

Figure 3:
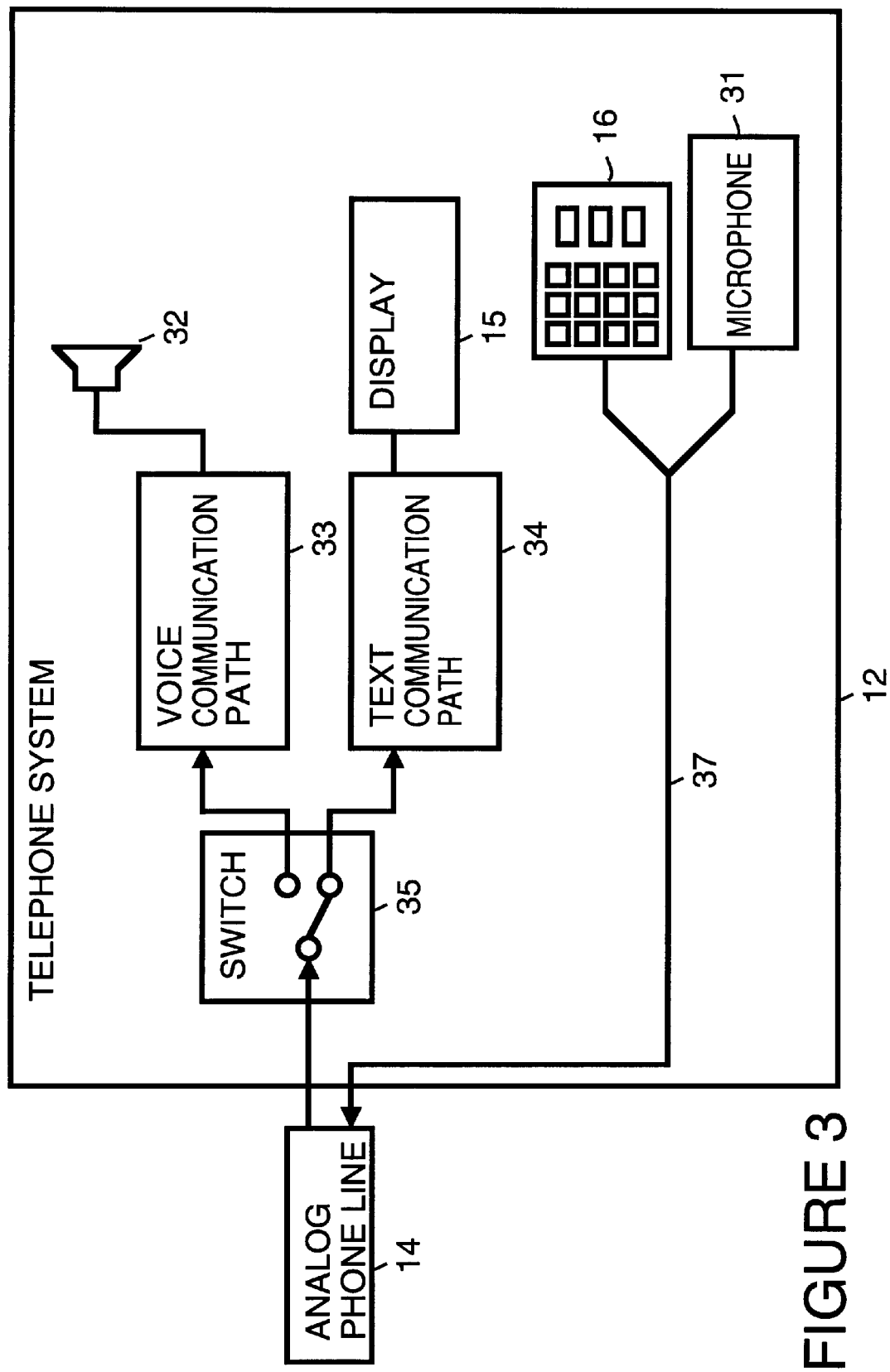
FIG. 3 is a simplified block diagram of the enhanced telephone shown in FIG. 1 in accordance with a preferred embodiment of the present invention.

FIG. 3 is a simplified block diagram of enhanced telephone 12. Switch logic 35 receives signals on connection line 14. If switch 35 recognizes the signals as being audio signals, switch 35 forwards the signals to voice communication path 33. The audio signals are then produced as sound by a speaker 32 which resides within handset 17 (shown in FIG. 1) or resides elsewhere on enhanced telephone 12.

If switch logic 35 recognizes the signals as being for text, switch 35 forwards the signals to text communication path 34. The text is then displayed on display 15. If the number of menu lines is less than or equal to the number of display lines in display 15, the full menu is displayed. If the number of menu lines is greater than the number of display lines in display 15, the full menu is partially displayed, and the user of enhanced telephone 12 can scroll up or down to display additional lines of the menu. Enhanced telephone 12 can buffer data to implement the scrolling feature or enhanced telephone 12 can request data line by line from text enhanced voice menu system server 10.

When a button 18 (shown in FIG. 1) has been used to disable the text enhanced voice menu mode of enhanced telephone 12, switch logic 35 always forwards the signals from connection line 14 to voice communication path 33.

When the text enhanced voice menu mode of enhanced telephone 12 is enabled, in response to reception of a query sent to enhanced telephone 12 to determine whether enhanced telephone 12 supports text enhancement, enhanced telephone 12 returns a text enhanced confirmation. When the text enhanced voice menu mode of enhanced telephone 12 is disabled, in response to reception of a query sent to enhanced telephone 12 to determine whether enhanced telephone 12 supports text enhancement, enhanced telephone 12 does not return a text enhanced confirmation.

Selections by a caller are received by enhanced telephone 12, for example, from keypad pad 16, in the form of DTMF tones or from a microphone 31, in the form of voice commands. The selections are forwarded through a data path 37 to connection line 14. Microphone 31 resides within handset 17 (shown in FIG. 1) or resides elsewhere on enhanced telephone 12.

Figure 4:
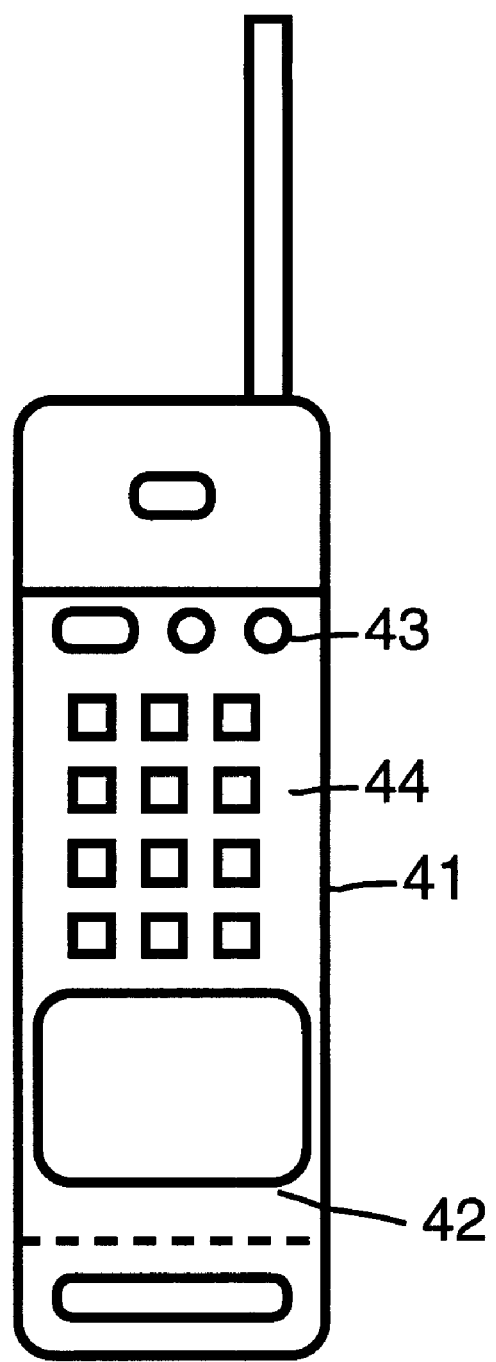
FIG. 4 shows an enhanced telephone in accordance with an alternative preferred embodiment of the present invention.

As illustrated by FIG. 4, enhanced telephone 12 may be replaced by a cellular phone 41 (or other portable phone) which includes a display 42 and a keypad 44. If the number of menu lines is less than or equal to the number of display lines in display 42, the full menu is displayed. If the number of menu lines is greater than the number of display lines in display 42, the full menu is partially displayed, and the user of enhanced telephone 41 can scroll up or down to display additional lines of the menu.

A button 43 is used to enable and disable the text enhanced voice menu mode of enhanced telephone 41.

Figure 5:

FIG. 5 shows a sample text menu displayed on display 42 of enhanced telephone 41. A user can select one of six options by depressing the corresponding key on keypad 44 or by speaking the corresponding number into the mouthpiece of enhanced telephone 41.

Figure 6:
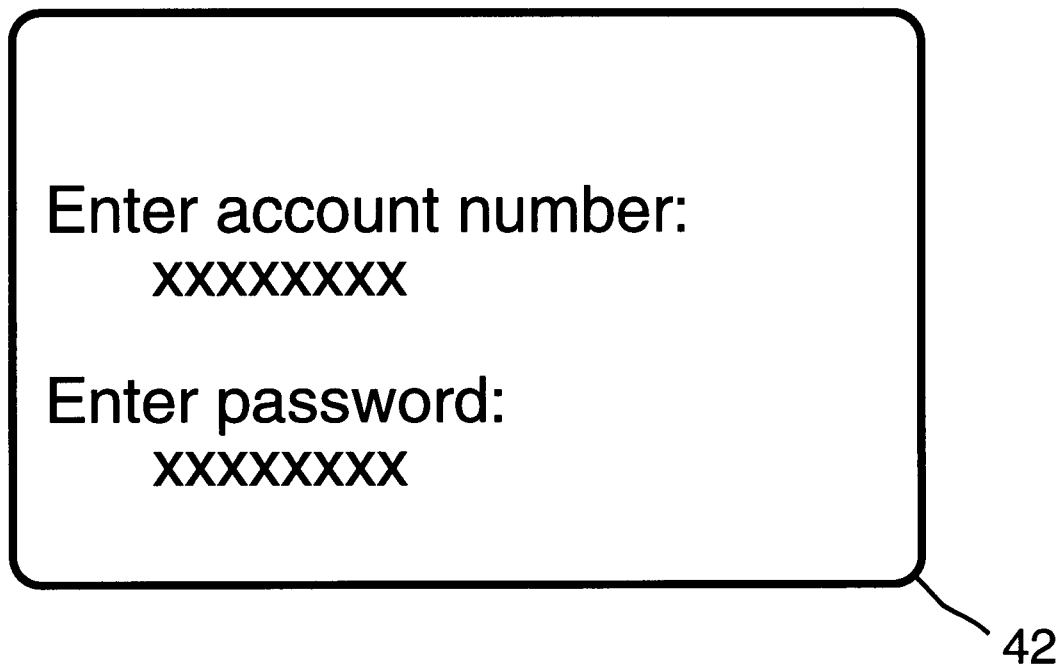

When the user depresses "1" on keypad 44 the DTMF tone is forwarded to text enhanced voice menu system server 10 (or selects the first option by voice), text enhanced voice menu system server 10 forwards a new menu, as shown in FIG. 6. After the user enters the appropriate account number and password using keypad 44, an account balance is displayed on display 42, as shown by FIG. 7.

What is claimed is:

1. A text enhanced voice menu system comprising:

data storage which stores audio information for producing a voice menu, and which stores text information for producing a text version of the voice menu;

a voice communication path, coupled to the data storage, for generating a voice menu from the audio information;

a text communication path, coupled to the data storage, for generating a text menu from the text information; and, switch logic, coupled to the voice communication path and the text communication path, for selecting one of the voice menu and the text menu to be transmitted over a connection line;

wherein the switch logic, in response to the text enhanced voice menu system receiving a telephone call, sends a query to a calling entity, and selects the text menu in response to reception of a text enhanced confirmation, the switch logic selecting the voice menu when no text enhanced confirmation is received.

2. A text enhanced voice menu system comprising:

data storage which stores audio information for producing a voice menu, and which stores text information for producing a text version of the voice menu;

a voice communication path, coupled to the data storage, for generating a voice menu from the audio information;

a text communication path, coupled to the data storage, for generating a text menu from the text information; and, switch logic, coupled to the voice communication path and the text communication path, for selecting one of the voice menu and the text menu to be transmitted over a connection line; and an enhanced telephone, the enhanced telephone comprising:
  a speaker;
  a display;
  a voice communication telephone path, coupled to the speaker, for producing audio on the speaker;
  a text communication telephone path, coupled to the display, for displaying text on the display; and,
  a phone switch logic, coupled to the voice communication telephone path and the text communication telephone path, for selecting one of the voice communication telephone path and the text communication telephone path to receive signals from a telephone connection line;

wherein:
  the switch logic, in response to the text enhanced voice menu system receiving a telephone call from the enhanced telephone, sends a query to the enhanced telephone, and selects the text menu in response to reception of a text enhanced confirmation, the switch logic selecting the voice menu when no text enhanced confirmation is received; and,
  the phone switch logic, in response to the query from the switch logic, returns the text enhanced confirmation.

3. A text enhanced voice menu system as in claim 2 wherein the enhanced telephone additionally includes:
  a button for enabling and disabling text enhancement, so that when text enhancement is disabled, the phone switch logic always selects the voice communication telephone path.

4. A text enhanced voice menu system as in claim 3 wherein when text enhancement is disabled, the phone switch logic is prevented from returning the text enhanced confirmation in response to the query from the switch logic.

5. A text enhanced voice menu system comprising:

data storage which stores audio information for producing a voice menu, and which stores text information for producing a text version of the voice menu;

a voice communication path, coupled to the data storage, for generating a voice menu from the audio information;

a text communication path, coupled to the data storage, for generating a text menu from the text information; and, switch logic, coupled to the voice communication path and the text communication path, for selecting one of the voice menu and the text menu to be transmitted over a connection line; and an enhanced telephone, the enhanced telephone comprising:
  a speaker;
  a display;
  a voice communication telephone path, coupled to the speaker, for producing audio on the speaker;
  a text communication telephone path, coupled to the display, for displaying text on the display; and,
  a phone switch logic, coupled to the voice communication telephone path and the text communication telephone path, for selecting one of the voice communication telephone path and the text communication telephone path to receive signals from a telephone connection line;
  wherein the enhanced telephone additionally includes:
    a button for enabling and disabling text enhancement, so that when text enhancement is disabled, the phone switch logic always selects the voice communication telephone path.

6. A method, for presenting a menu to caller, the method comprising the following steps:
  (a) receiving a telephone call from a telecommunications device;
  (b) sending a query to determine whether the telecommunications device is text enhanced;
  (c) sending a text menu to the telecommunications device when a text enhanced confirmation is received from the telecommunications device; and,
  (d) sending a voice menu to the telecommunications device when no text enhanced confirmation is received from the telecommunications device.

7. A method as in claim 6 additionally comprising the following step:
  (e) receiving menu selections from the telecommunications device via DTMF tones.

8. A method as in claim 6 additionally comprising the following step:
  (e) receiving menu selections from the telecommunications device via voice from a caller.

9. An enhanced telephone, the enhanced telephone comprising:
  a speaker;
  a display;
  a voice communication telephone path, coupled to the speaker, for producing audio on the speaker;
  a text communication telephone path, coupled to the display, for displaying text on the display;
  a phone switch logic, coupled to the voice communication telephone path and the text communication telephone path, for selecting during a call one of the voice communication telephone path and the text communication telephone path from a telephone connection line to receive all further signals of that call, the phone switch logic, in response to a query from a text enhanced voice menu system, returning a text enhanced confirmation; and,
  a button for enabling and disabling text enhancement, so that when text enhancement is disabled, the phone switch logic always selects the voice communication telephone path.

10. An enhanced telephone in claim 9 wherein when text enhancement is disabled, the phone switch logic is prevented from returning the text enhanced confirmation in response to the query from the text enhanced voice menu system.

* * * * *